March 20, 1956 S. C. BRONSON 2,738,658
SEPARATION OF GAS BY SOLIDIFICATION
Filed Dec. 24, 1952
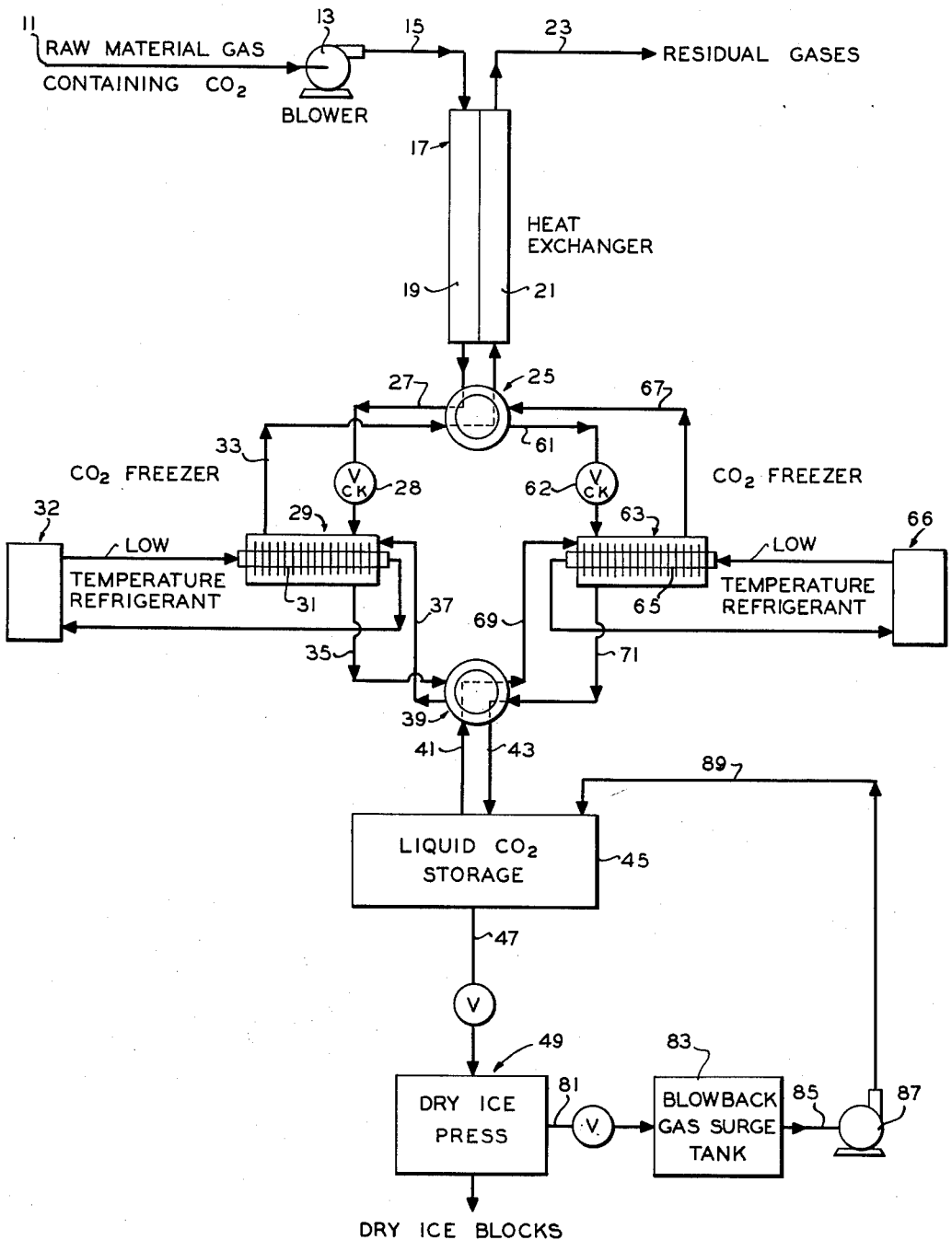
INVENTOR
SAMUEL C. BRONSON
BY
H. Hume Matheson
ATTORNEY

United States Patent Office 2,738,658
Patented Mar. 20, 1956

2,738,658

SEPARATION OF GAS BY SOLIDIFICATION

Samuel C. Bronson, New York, N. Y., assignor to Air Reduction Company, Incorporated, New York, N. Y., a corporation of New York Application December 24, 1952, Serial No. 327,843

8 Claims. (Cl. 62—122)

This invention relates to the separation of carbon dioxide from gas mixtures and to the conversion of the separated solid carbon dioxide into liquid carbon dioxide.

It is an object of this invention to provide an effective, simple and economical method and apparatus for separating carbon dioxide from a gaseous mixture containing more volatile constituents and liquefying the separated carbon dioxide.

It is another object of this invention to provide a separation process which will give high yields of carbon dioxide from gaseous mixtures having a small percentage of carbon dioxide and having other gases which are more volatile than carbon dioxide.

It is a further object to integrate carbon dioxide separating and liquefying steps with means for liquid carbon dioxide storage, and Dry Ice block formation in an efficient manner.

At present, many of the processes now in use for separating carbon dioxide from gaseous mixtures and liquefying the separated carbon dioxide involve the absorption of gaseous carbon dioxide in some solvent such as potassium hydroxide or monoethanolamine and then the desorption of carbon dioxide therefrom. In carbon dioxide plants which operate in accordance with the foregoing, there is a definite economical disadvantage since the percent recovery of carbon dioxide by absorption from the gaseous mixtures is not substantially 100 per cent. Without a recovery which approaches 100 per cent, it is, of course, obvious that there is an appreciable process loss in the absorption systems which loss is accentuated if the step of obtaining the carbon dioxide mixture involves burning an expensive raw material, such as fuel oil, to obtain a gaseous mixture containing carbon dioxide as is currently done in some commercial installations.

Another disadvantage of the absorption-desorption methods of separating carbon dioxide from gaseous mixtures is the corrosion problem which is inherent with certain absorbing medium or results from the decomposition thereof, due to the effect of heat.

In absorption-type plants after the carbon dioxide has been separated from the gas mixture and then the absorbing medium, the next step is usually to convert the carbon dioxide into its liquid phase. The conventional method has been to compress the carbon dioxide gas in compressors and then to liquefy it by means of heat exchangers so that the carbon dioxide is in suitable form for sale as liquid or for use in the production of Dry Ice blocks by means of a Dry Ice press in which the liquid carbon dioxide is converted into snow and gas.

The instant invention contemplates a simplified method which does not involve absorption and desorption of carbon dioxide and hence avoids the above-mentioned disadvantages, such as the corrosion problem which results in the use of monoethanolamine. Furthermore the step of compressing the separated carbon dioxide is eliminated. The above-mentioned objects are accomplished in accordance with the method in which the instant invention is incorporated in the following manner. A raw gas mixture containing carbon dioxide and other more volatile gases at a pressure below 5.11 atmospheres is preferably cooled by a residual gas stream and then is passed to a freezer. In the freezer which is cooled by a very low temperature refrigerant, such as liquid nitrogen, the carbon dioxide is deposited as a solid on a freezing surface. After a suitable deposit, the flow of the raw gas mixture and the supply of refrigerant are stopped and the pressure-temperature conditions on the deposited carbon dioxide are raised to above the triple point to the values which give liquid carbon dioxide. This pressure-temperature increase causes the solid carbon dioxide to liquefy and the liquid thus produced is then transferred by gravity or suitable pumping means to a liquid carbon dioxide storage tank from which it can be fed to a Dry Ice press for making Dry Ice blocks or otherwise utilized. The change to above triple point conditions on the deposited carbon dioxide is preferably effected by placing the liquid carbon dioxide storage tank, which is maintained appreciably above 5.11 atmospheres absolute and $-56.6°$ C. (triple point conditions), in direct communication with the freezer. It is also preferred to use two freezers alternately or a series of freezers and to recover blowback gas from the Dry Ice press by returning the blowback gas to the storage tank which, as mentioned, is preferably associated with the freezers.

With the foregoing method, it is apparent that, since a very low temperature is used and a gas to solid separation results, very high yields of carbon dioxide from gaseous mixtures are possible. The process is also adaptable and quite suitable for treating certain waste gases which contain large percentages of carbon dioxide since the low temperature refrigeration can be adjusted easily to handle appreciable carbon dioxide variations. It is also to be noted that the separated carbon dioxide is converted in a simple manner without compression into the liquid form desired for further processing.

Other objects and advantages of the invention will be apparent as it is better understood by reference to the following description and the accompanying drawing.

Referring to the drawing which indicates diagrammatically apparatus suitable for the practice of the invention, an inlet pipe 11 for the gaseous mixture is shown connected to blower 13. The gaseous mixture, for example, the waste gas from a synthetic ammonia plant which contains large quantities of carbon dioxide mixed with hydrogen, nitrogen, carbon monoxide and small amounts of oxygen, is introduced into inlet pipe 11 at about atmospheric temperature and pressure. Blower 13 connected to inlet pipe 11 moves the gas mixture at the proper flow rate to heat exchanger 17 via pipe 15 which connects with passage 19 of the heat exchanger 17. The gas mixture, as it passes through passage 19, is cooled by indirect heat exchange with counterflowing process gases in passage 21 of heat exchanger 17. These process gases are obtained in a manner which will be subsequently described and, after cooling the incoming gas mixture in exchanger 17, leave the exchanger by means of conduit 23.

The cooled, incoming gas mixture next flows through a two-passage switch valve 25 and conduit 27 having check valve 28 to the carbon dioxide freezer 29. Freezer 29 can be of any conventional construction which is suitable for the process and contains a finned freezing coil 31 or other device having extended surfaces. This freezing coil 31 is so built as to provide an efficient means for solidifying and then liquefying of carbon dioxide since these steps occur in the process. The coil 31 is suitably connected in a liquid nitrogen or liquid air refrigeration system 32 which is capable of supplying these low temperature refrigerants to coil 31 in the amounts required. By this means, carbon dioxide is caused to deposit on freezing coil 31 and so is separated from the other residual gases in the incoming gas mixture, such as hydrogen, nitrogen, carbon monoxide, and oxygen. These residual gases which have been cooled are removed from the freezer 29 through conduit 33 and then are passed back through switch valve 25 to passage 21 of heat exchanger 17. In exchanger 17, these cooled residual gases are used to cool the incoming gas mixture, as previously described.

After the freezing coil 31 has frozen out its efficient capacity of carbon dioxide, the switch valve 25 will be adjusted so that neither passage of the heat exchanger 17 is in communication with freezer 29. By this adjustment, the incoming gaseous mixture does not pass from the exchanger 17 to the freezer 29 and, of course, no residual gases return to the exchanger from the freezer. Suitable conventional means (not shown) are provided for determining when the proper deposition of carbon dioxide in the freezer has occurred and the switching of the valves can be done manually or automatically in response to such a determination.

Simultaneously with the adjustment of switch valve 25, the freezer 29 with its coil 31 having a deposit of carbon dioxide thereon is placed in communication with the large liquid carbon dioxide storage tank by means of conduits 35 and 37, a second two-passage switch valve 39 and conduits 41 and 43 through adjustment of switch valve 39. The liquid carbon dioxide storage tank 45 can be any conventional storage means suitably constructed and arranged for the storage of liquid carbon dioxide at a pressure and temperature above triple point. At the same time, the supply of refrigerant to the coil 31 is stopped by conventional means (not shown).

After the adjustment of switch valve 39, some of the gaseous carbon dioxide above the liquid carbon dioxide in the tank which is maintained above triple point flows into conduit 41 and through switch valve 39 and conduit 37 into the interior freezer 29 which is appreciably below the triple point conditions. In this manner the conditions in the freezer 29 and hence on the deposited solid carbon dioxide are increased rapidly to values above the triple point and the solid carbon dioxide is converted to liquid. This liquid carbon dioxide, derived from the incoming raw gas, is then drained from coil 31 and collected in the bottom of the freezer 29 and flows through conduit 35, switch valve 39, and conduit 43 by gravity into storage tank 45. This transfer causes a displacement of the carbon dioxide gas in the tank and most of this gas passes through pipe 41 and 37 and is eventually collected as liquid on the freezing coil 31. The liquid carbon dioxide thus formed is handled as is the liquefied carbon dioxide derived from the deposited solid carbon dioxide.

It is to be noted that the large liquid carbon dioxide storage tank constitutes, in relation to the freezer, a heat source and that carbon dioxide gas from the tank undergoes a heat-releasing change of state in the freezer. This released heat is effective in changing the deposited solid carbon dioxide to liquid carbon dioxide. During the initial admission of the storage tank gas to the freezer and under conditions below triple point, the carbon dioxide gas will tend to change from gas directly to solid with consequent release of heat corresponding to that heat absorbed during sublimation.

The foregoing description concerns the use of one freezer. In the disclosed preferred embodiment of the invention, a second freezer 63 is used and the piping and valves which are necessary to give continuous production by alternate use of the freezers are provided. Thus, when the desired deposit of solid carbon dioxide has been built up in freezer 29, the adjustment of the switch valve 25 is such as to direct incoming gas into pipe 61 having check valve 62 which connects to the second freezer 63 having a freezing coil 65 supplied by refrigeration system 66. With this alternate arrangement, carbon dioxide is deposited on coil 65 of freezer 63 and the residual gases leave the freezer 63 by conduit 67 which is connected to passage 21 of heat exchanger 17 through switch valve 25. The residual gases from freezer 63 cool the incoming gases in the same manner as those from freezer 29. The two switch valves 25 and 39 and the supplies of refrigerant are adjusted simultaneously by suitable means (not shown) so that while one freezer is refrigerated and is collecting solid carbon dioxide from incoming gases, the other freezer is not refrigerated and is used to liquefy previously-deposited carbon dioxide for delivery to the storage tank 45. It is to be noted that check valves 28 and 62 respectively assure that any gases above approximately atmospheric pressure in freezers 29 and 63 are forced to leave the freezers through their respective residual gas conduits 33 and 67 so that the incoming raw gases containing carbon dioxide from the blower 13 will promptly flow into the freezers.

Of course with the use of two freezers, it is also possible to have a delay between the liquefying step and the depositing step so that the refrigeration system can reduce the pressure in the freezer which has been used in liquefying and hence collect most of the carbon dioxide gas remaining in the freezer. With this delay arrangement which can be effected by a temporary no-inflow setting of switch valve 25 by conventional means (not shown), none of the high pressure gas (having a very high carbon dioxide percentage) in the freezers will pass out the residual waste gas flow path and be lost.

It is to be understood that a series or multiplicity of freezers could be used with suitably-arranged and timed flow valves and refrigeration valves so that the action of the refrigerant will be effective in reducing the pressure in the freezers to about the pressure of the incoming raw gas, as was described above in relation to the operation of a single freezer. Thus, while freezer A is being used to freeze out carbon dioxide, freezer B would be liquefying deposited solid carbon dioxide and freezer C would be refrigerating so that the pressure, due principally to gas with a very high carbon dioxide content, would be reduced to that of the incoming raw gas. In this manner check valves, similar to valves 28 and 62, would not be required. Of course, it is obvious that more than three freezers can be used, if desired or required.

The liquid carbon dioxide in the tank 45 is shown as being used to produce Dry Ice blocks. For this purpose, a valved conduit 47 is connected to tank 45 and provides the means for getting liquid carbon dioxide to Dry Ice press 49. In this press, liquid carbon dioxide is first converted to solid carbon dioxide and gaseous carbon dioxide by any of several well-known methods. The solid carbon dioxide or snow which is formed is conventionally pressed into Dry Ice blocks. Means are provided for recovering the gaseous carbon dioxide (which is known as blowback gas) from the snow operation. This means comprises valved conduit 81 connecting the Dry Ice press 49 to a surge tank 83 and conduit 85 leading to compressor 87. This compressor 87 raises the pressure of the blowback gases to above triple point pressure and discharges the blowback gases into pipe 89 which connects to the liquid carbon dioxide storage tank 45. If required suitable water-cooled means (not shown) can be placed in the flow path of the compressed blowback gas in order to cool this gas to some extent prior to its admission to the storage tank 45.

The operation of the apparatus and the steps of the method are believed to be apparent from the foregoing description. However, it is to be noted that in the process carbon dioxide is recovered from a gaseous mixture containing more volatile constituents as a solid and that the frozenout carbon dioxide is converted to the liquid phase which is desired for subsequent processing by raising the pressure and temperature thereon without mechanical compression. Thus, in accordance with the present process and with reference to the flow through one freezer, a gas mixture containing carbon dioxide at a pressure below triple point (5.11 atmosphere absolute) is introduced into heat exchanger 17. In this heat exchanger, the raw gas mixture is cooled by residual waste gas which is recovered in the subsequent separation step. In this manner, refrigeration is recovered from the waste and the incoming raw gas is initially cooled. The cooled carbon dioxide-bearing gas is next brought into contact with a very cold evaporator coil 31 in a freezer 29 and the carbon dioxide freezes out as a solid on the coil. It is to be noted that at the very low temperatures contemplated, for example −196° C. for nitrogen, and at atmospheric pressure, the partial pressure of carbon dioxide is very small and hence substantially all of the carbon dioxide can be removed from gas mixtures. After a predetermined time which is determined by the efficient capacity of the coil, the flow of carbon dioxide-bearing gas and refrigerant supply are stopped and the interior of the freezer 29 is placed in direct communication with the vapor phase of the liquid carbon dioxide storage tank 45. This results in a increase in pressure and temperature and causes the solidified carbon dioxide on the evaporator coil to liquefy. The liquid carbon dioxide thus produced is then transferred to the storage tank 45 by gravity means. Some of the carbon dioxide gas which is displaced from the storage tank 45 passes into the freezer through suitable connections and is eventually collected as a liquid on the freezer. This liquid carbon dioxide is handled in the same manner as the liquid carbon dioxide derived from the incoming gas. After a length of time approximately equal to the period during which the carbon dioxide-bearing gas was flow through the freezer 29, communication with the storage tank is discontinued and the supply of refrigerant begins. In this manner, the pressure and temperature in the freezer 29 will fall towards the triple point because of the refrigerative effect on the gas in the freezer. When the pressure has reached approximately the pressure in the heat exchanger 17, the flow of carbon dioxide-bearing gas to the freezer will be resumed. Of course with alternate use of the two freezers and hence continuous production, this slight delay for a pressure decrease must be provided for as has been been described.

The liquid which is thus obtained from the freezer is fed to a conventionad Dry Ice press 49. The carbon dioxide gas at low pressure which is a by-product (known as blowback gas) from the expansion of liquid to carbon dioxide snow in the press is compressed in compressor 87 to above 5.11 atmosphere absolute and returned to the storage tank 45. By this recovery system, the compressed blowback gas is effective in maintaining the storage tank at the desired pressure and temperature while at the same time the refrigerative effect of freezer coil is indirectly utilized in converting the blowback gas to the desired liquid carbon dioxide.

It is apparent that the herein described method and apparatus have decided advantages in that the yield of carbon dioxide obtained from gaseous mixtures approaches 100 per cent and that the processing of the recovered carbon dioxide to the desired liquid form is accomplished in a simple manner. Another notable feature of the preferred embodiment is that the solid-to-liquid conversion is rapidly accomplished by placing the freezer in communication with the liquid storage tank which is mantained at the desired pressure, that is, above the triple point pressure (5.11 atmospheres absolute) and above triple point temperature.

It is to be understood that many gaseous mixtures containing carbon dioxide and other constituents which are more volatile than carbon dioxide, other than the above-mentioned ammonium synthesis waste gases, can be treated by the instant process as will be apparent to one skilled in the art. It is also within the skill of the art to compress the incoming gaseous mixture to some pressure below that of 5.11 atmospheres absolute under some circumstances, if desired without departing from the invention. It is also to be understood that various other changes can be made in the details of the procedure and in the apparatus without departing from the invention as defined in the appended claims.

I claim:

1. A method for making solid carbon dioxide from a gaseous mixture containing carbon dioxide and other constituents which are more volatile than carbon dioxide comprising freezing out the carbon dioxide as a solid from the gaseous mixture by indirect heat exchange with a low temperature refrigerant, liquefying the solid carbon dioxide by increasing the pressure and temperature thereof to above triple point, transferring liquefied carbon dioxide to a solidifying zone, decreasing the pressure on the transferred liquid carbon dioxide in order to form solid carbon dioxide and gaseous carbon dioxide, compressing the gaseous carbon dioxide thus formed, and utilizing such compressed carbon dioxide in said liquefying step.

2. A method for obtaining liquid carbon dioxide comprising introducing a quantity of gaseous mixture, at about atmospheric pressure, a carbon dioxide and other gases which are more volatile than carbon dioxide into a freezing zone having a refrigerated surface, maintaining said refrigerated surface at a temperature appreciably below −78° C. whereby the carbon dioxide gas is deposited and changed to a solid on said refrigerated surface and thus is separated from the residual gases of said quantity of gaseous mixture, removing said residual gases from said freezing zone, converting said solid carbon dioxide to a liquid by stopping said step of maintaining said refrigerated surface and by increasing the pressure thereon to above 5.11 atmospheres absolute and the temperature to above −56.6° C., implementing said conversion step by placing said freezing zone in communication with a vapor space of a carbon dioxide storage zone which is maintained at a pressure above 5.11 atmospheres absolute and at a temperature above −56.6° C. whereby said increase in pressure and temperature in the freezing zone results more rapidly due to carbon dioxide vapors passing into said freezing zone, removing said liquid from said freezing zone as a liquid and reducing the pressure in said freezing zone to about atmospheric pressure by again effecting said step of maintaining said refrigerated surface whereby said carbon dioxide vapors are condensed on said refrigerated surface.

3. The method for separating and then recovering carbon dioxide as a liquid from a gaseous mixture containing carbon dioxide in a quantity which exceeds the amount in atmospheric air and containing other gases which are more volatile than carbon dioxide, said method comprising moving said gaseous mixture as a stream into indirect heat exchange with a very low temperature liquid refrigerant in a freezing device in a freezing chamber so that the carbon dioxide is separated from the gaseous mixture and is formed into solid carbon dioxide on said freezing device, then liquefying said separated solid carbon dioxide on said freezing device by increasing the pressure thereon to above 5.11 atmospheres absolute and the temperature thereof to above −56.6° C. so that liquid carbon dioxide results and removing said liquid carbon dioxide in liquid phase from said freezing chamber.

4. The method according to claim 3 and further including the features that a residual gas flow results when said carbon dioxide is separated from said gaseous mixture and that said residual gas flow is used immediately without further processing to cool said gaseous mixture immediately prior to said step of moving.

5. The method according to claim 3 and further including the steps of maintaining a large quantity of gaseous carbon dioxide appreciably above the triple point temperature and pressure of carbon dioxide, and utilizing said gaseous carbon dioxide in said liquefying step so that said pressure and temperature increases are accomplished more rapidly.

6. The method of separating and recovering in liquid phase a high boiling point gas from a gaseous mixture at a predetermined pressure below the triple point pressure of said high boiling point gas and containing at least one lower boiling point gas and a significant percentage of said high boiling point gas said method comprising solidifying said high boiling point gas as solid particles deposited on a freezing device in a freezer chamber by supplying said device with a liquid low temperature refrigerant and by moving said mixture into said chamber, removing the residue gas mixture from said chamber, stopping said step of supplying of said freezing device with liquid refrigerant after a predetermined quantity of said solid particles are deposited, stopping said steps of moving and removing, liquefying said deposited particles to form a liquid by increasing the temperature and pressure in said freezing chamber to above triple point temperature and pressure, withdrawing said liquid from said chamber, maintaining a quantity of the high boiling point gas at about its triple point pressure, and passing part of said quantity of said gas at about its triple point pressure into direct contact with said solid particles during said liquefying step in order to aid in establishing said triple point pressure.

7. The method according to claim 6 and further including the step of reducing the pressure in said chamber to about said predetermined pressure by supplying low temperature liquid refrigerant to said freezing device so that the high boiling point gas therein is condensed and, after the pressure is reduced, repeating the preceding steps beginning with said step of solidifying.

8. Apparatus for continuously separating and recovering in liquid form the carbon dioxide content of a gaseous mixture of carbon dioxide and other gases which are more volatile than carbon dioxide comprised of a first freezer and a second freezer each having a carbon dioxide freezing coil connected to a supply of liquid nitrogen, a heat exchanger having a first passage connected to a supply of said gaseous mixture and a second passage for said other gases after separation of carbon dioxide, said freezers being connected by flow means including a switch valve to said first passage and said second passage and so arranged that said gaseous mixture can be passed initially to said first freezer and secondly to said second freezer and so that said other gases, after carbon dioxide is deposited in the respective freezers, are passed alternately from said first freezer and said second freezer to said second passage, said freezers also being connected to a storage tank containing liquid carbon dioxide by passage means including a switch valve constructed and arranged to establish a fluid passage between the top of said storage tank and initially said second freezer and secondly said first freezer and to establish a liquid carbon dioxide passage initially between said second freezer and said storage tank and secondly between said first freezer and said storage tank.

References Cited in the file of this patent

UNITED STATES PATENTS

| 1,818,816 | Rufener | Aug. 11, 1931 |
|---|---|---|
| 1,870,691 | Rust | Aug. 9, 1932 |
| 1,893,852 | Sullivan | Jan. 10, 1933 |
| 1,971,106 | Hasche | Aug. 21, 1934 |
| 1,981,676 | Stapp | Nov. 20, 1934 |
| 1,992,486 | Hunt | Feb. 26, 1935 |
| 2,011,551 | Hasche | Aug. 13, 1935 |
| 2,143,283 | Schmidt | Jan. 10, 1939 |
| 2,325,045 | Dennis | July 27, 1943 |
| 2,341,698 | Dennis | Feb. 15, 1944 |
| 2,504,051 | Scheibel | Apr. 11, 1950 |
| 2,537,044 | Garbo | Jan. 9, 1951 |
| 2,632,316 | Eastman | Mar. 24, 1953 |

FOREIGN PATENTS

| 341,361 | Great Britain | Jan. 15, 1931 |